US009288751B2

(12) United States Patent
Finkelstein et al.

(10) Patent No.: US 9,288,751 B2
(45) Date of Patent: Mar. 15, 2016

(54) USE OF POSITION DATA TO SELECT WIRELESS ACCESS POINT

(75) Inventors: Jeffrey Finkelstein, San Francisco, CA (US); Edmund Tse, Stanford, CA (US); David Williams, Belmont, CA (US); Stephane Maes, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 11/897,240

(22) Filed: Aug. 29, 2007

(65) Prior Publication Data

US 2009/0061870 A1 Mar. 5, 2009

(51) Int. Cl.
*H04M 1/725* (2006.01)
*H04W 48/20* (2009.01)
*H04W 88/02* (2009.01)

(52) U.S. Cl.
CPC .............. *H04W 48/20* (2013.01); *H04W 88/02* (2013.01)

(58) Field of Classification Search
CPC ....... H04H 64/00; H04H 48/16; H04H 36/32; H04H 48/20; H04H 48/08; H04H 36/14; H04H 88/06; H04H 88/02; H04M 15/8033; G06Q 20/04; G06Q 20/32; H04B 17/0085; H04B 17/309
USPC ................ 455/412.1, 456.1–456.3, 434, 525, 455/552.1, 412.2
See application file for complete search history.

(56) References Cited

U.S. PATENT DOCUMENTS

| | | | |
|---|---|---|---|
| 4,907,290 | A | 3/1990 | Crompton |
| 5,010,547 | A | 4/1991 | Johnson et al. |
| 5,012,219 | A | 4/1991 | Henry |
| 5,075,684 | A | 12/1991 | DeLuca |
| 5,359,317 | A | 10/1994 | Gomez et al. |
| 5,394,140 | A | 2/1995 | Wong et al. |
| 5,430,436 | A | 7/1995 | Fennell |
| 5,594,796 | A | 1/1997 | Grube et al. |
| 5,612,682 | A | 3/1997 | DeLuca et al. |
| 5,650,776 | A | 7/1997 | Mitchell et al. |
| 5,699,244 | A | 12/1997 | Clark, Jr. et al. |
| 5,705,995 | A | 1/1998 | Laflin et al. |
| 5,720,200 | A | 2/1998 | Anderson et al. |

(Continued)

FOREIGN PATENT DOCUMENTS

EP 1 703 679 A1 9/2006
WO WO-2004/073342 A1 8/2004

OTHER PUBLICATIONS

US Office Action on U.S. Appl. No. 11/540,909 mail date Jun. 10, 2009, 11 pgs.

(Continued)

*Primary Examiner* — Mahendra Patel
(74) *Attorney, Agent, or Firm* — Norton Rose Fulbright US LLP

(57) ABSTRACT

A mobile computing device comprises a radio frequency transceiver, a memory, and processing circuit. The radio frequency transceiver is configured to communicate with wireless access points. The memory is configured to store position data representative of a position of the mobile computing device and wireless access point data for a plurality of wireless access points. The processing circuit is configured to select one of the plurality of wireless access points based on the position data and to initiate wireless communication with the selected wireless access point.

31 Claims, 6 Drawing Sheets

(56) References Cited

U.S. PATENT DOCUMENTS

| | | | |
|---|---|---|---|
| 5,850,187 A | 12/1998 | Carrender et al. | |
| 5,875,434 A | 2/1999 | Matsuoka et al. | |
| 5,903,852 A | 5/1999 | Schaupp, Jr. et al. | |
| 5,929,848 A | 7/1999 | Albukerk et al. | |
| 5,938,712 A | 8/1999 | Ibamoto et al. | |
| 5,938,721 A | 8/1999 | Dussell et al. | |
| 5,958,006 A | 9/1999 | Eggleston et al. | |
| 5,974,330 A * | 10/1999 | Negishi | 455/457 |
| 5,987,062 A * | 11/1999 | Engwer | H04B 17/0085 370/251 |
| 6,016,476 A | 1/2000 | Maes et al. | |
| 6,047,579 A | 4/2000 | Schmitz | |
| 6,061,561 A * | 5/2000 | Alanara et al. | 455/456.1 |
| 6,104,291 A | 8/2000 | Beauvillier et al. | |
| 6,111,538 A | 8/2000 | Schuchman et al. | |
| 6,157,630 A | 12/2000 | Adler et al. | |
| 6,177,905 B1 | 1/2001 | Welch | |
| 6,182,010 B1 | 1/2001 | Berstis | |
| 6,182,221 B1 | 1/2001 | Hsu et al. | |
| 6,243,689 B1 | 6/2001 | Norton | |
| 6,246,376 B1 | 6/2001 | Bork et al. | |
| 6,259,405 B1 * | 7/2001 | Stewart et al. | 342/457 |
| 6,297,737 B1 | 10/2001 | Irvin | |
| 6,307,919 B1 | 10/2001 | Yoked | |
| 6,313,745 B1 | 11/2001 | Suzuki | |
| 6,346,881 B1 | 2/2002 | Davidson | |
| 6,389,290 B1 | 5/2002 | Kikinis et al. | |
| 6,404,761 B1 | 6/2002 | Snelling et al. | |
| 6,424,845 B1 | 7/2002 | Emmoft et al. | |
| 6,456,234 B1 | 9/2002 | Johnson | |
| 6,487,180 B1 | 11/2002 | Borgstahl et al. | |
| 6,499,000 B2 | 12/2002 | Flentov et al. | |
| 6,542,750 B2 | 4/2003 | Hendrey et al. | |
| 6,580,700 B1 * | 6/2003 | Pinard | G06K 17/0022 370/252 |
| 6,601,093 B1 | 7/2003 | Peters | |
| 6,681,108 B1 | 1/2004 | Terry et al. | |
| 6,731,613 B1 | 5/2004 | Provance | |
| 6,757,718 B1 | 6/2004 | Halverson et al. | |
| 6,772,331 B1 | 8/2004 | Hind et al. | |
| 6,832,178 B1 | 12/2004 | Fernandez et al. | |
| 6,847,823 B2 * | 1/2005 | Lehikoinen | G06Q 30/0241 455/456.1 |
| 6,885,971 B2 | 4/2005 | Vock et al. | |
| 6,907,134 B1 | 6/2005 | Yamada et al. | |
| 6,934,664 B1 | 8/2005 | Webb et al. | |
| 6,941,270 B1 | 9/2005 | Hannula | |
| 6,963,818 B2 | 11/2005 | Flentov et al. | |
| 6,982,962 B1 | 1/2006 | Lunsford et al. | |
| 7,092,846 B2 | 8/2006 | Vock et al. | |
| 7,171,331 B2 | 1/2007 | Vock et al. | |
| 7,266,379 B2 | 9/2007 | Blight et al. | |
| 7,360,248 B1 | 4/2008 | Kanevsky et al. | |
| 2002/0010617 A1 | 1/2002 | Hamaguchi et al. | |
| 2002/0019584 A1 | 2/2002 | Schulze et al. | |
| 2002/0036991 A1 | 3/2002 | Inoue | |
| 2002/0059453 A1 | 5/2002 | Eriksson et al. | |
| 2002/0061031 A1 | 5/2002 | Sugar et al. | |
| 2002/0078075 A1 | 6/2002 | Colson et al. | |
| 2002/0136184 A1 | 9/2002 | Liang et al. | |
| 2002/0147717 A1 | 10/2002 | Barros et al. | |
| 2002/0184331 A1 | 12/2002 | Blight et al. | |
| 2002/0184418 A1 | 12/2002 | Blight | |
| 2002/0187792 A1 | 12/2002 | Kato et al. | |
| 2002/0194498 A1 | 12/2002 | Blight et al. | |
| 2004/0106379 A1 | 6/2004 | Zen et al. | |
| 2004/0193499 A1 | 9/2004 | Ortiz et al. | |
| 2005/0064866 A1 * | 3/2005 | Sun | H04W 36/14 455/426.1 |
| 2005/0070279 A1 * | 3/2005 | Ginzburg et al. | 455/434 |
| 2005/0170824 A1 * | 8/2005 | Dowling | 455/418 |
| 2005/0227692 A1 * | 10/2005 | Kawashima | H04W 36/365 455/435.2 |
| 2006/0063560 A1 * | 3/2006 | Herle | 455/552.1 |
| 2006/0095348 A1 | 5/2006 | Jones et al. | |
| 2007/0091861 A1 | 4/2007 | Gupta et al. | |
| 2007/0149214 A1 * | 6/2007 | Walsh et al. | 455/456.1 |
| 2007/0223432 A1 * | 9/2007 | Badarinath | 370/338 |

OTHER PUBLICATIONS

US Office Action on U.S. Appl. No. 11/809,198 mail date May 21, 2009, 19 pgs.

US Office Action on U.S. Appl. No. 11/823,850, mail date Apr. 27, 2009, 14 pgs.

Amendment and Reply on U.S. Appl. No. 11/540,909 filed Aug. 10, 2009, 5 pgs.

Amendment and Reply on U.S. Appl. No. 11/809,198 filed Jul. 21, 2009, 4 pgs.

Amendment and Reply on U.S. Appl. No. 11/823,850 filed Jul. 27, 2009, 14 pgs.

U.S. Appl. No. 11/823,850, filed Jun. 28, 2007, Kammer.

U.S. Appl. No. 11/809,198, filed May 31, 2007, Blight et al.

U.S. Appl. No. 11/706,872, filed Feb. 15, 2007, Wong et al.

U.S. Appl. No. 11/540,909, filed Sep. 29, 2006, Blight et al.

U.S. Appl. No. 11/428,532, filed Jul. 3, 2006, Gupta et al.

U.S. Appl. No. 10/006,952, filed Nov. 5, 2001, Kammer.

"New Riverside University Dictionary", published by The Riverside Publishing Company, Copyright © 1984 by Houghton Mifflin Company, p. 81.

Skyhook Wireless, "How It Works", printed from internet address: http://developer.skyhookwireless.com/how-it-works/, on Apr. 12, 2007, 2 pages.

Palm™ m505 Handheld, printed from internet address: http://www.palm.com/products/palmm505/ on Sep. 20, 2001 (5 views).

U.S. Appl. No. 60/725,892 entitled "Wireless Connectivity User-Interface Features", filed Oct. 11, 2006, 3 pages.

Extended European Search Report, European Application No. 08797862.3, Date: Feb. 24, 2012, pp. 1-8.

\* cited by examiner

USE OF POSITION DATA TO SELECT WIRELESS ACCESS POINT

BACKGROUND

Mobile computing devices, such as mobile telephones, laptop computers, and personal digital assistants, can communicate with different wireless networks in different locations. The same mobile computing device may communicate via a wired network in an office building, a Wi-Fi network at home or at a hotel, and a cellular network while in a moving vehicle.

DETAILED DESCRIPTION OF EXEMPLARY EMBODIMENTS

Described herein is a system and method which improves the speed with which a device may select and communicate with a wireless access point. Further described is a system and method of creating a database of preferred wireless access points using position data. Further described is a system and method that avoids wasting time looking for a preferred wireless access point in the wrong location. Further described is a system and method that saves battery power by avoiding scanning or polling for wireless access points not in the vicinity of the mobile computing device. Further described is a system and method of selecting a wireless access point based on position data, which may be displayed for user-initiated communication or used to initiate communication without user input (e.g., automatically). Further described is a system and method of selecting a wireless access point based on position data and a database of wireless access points meeting security or reliability criteria.

The teachings herein extend to those embodiments which fall within the scope of the appended claims, regardless of whether they accomplish one or more of the above-mentioned exemplary advantages.

Figure 1:
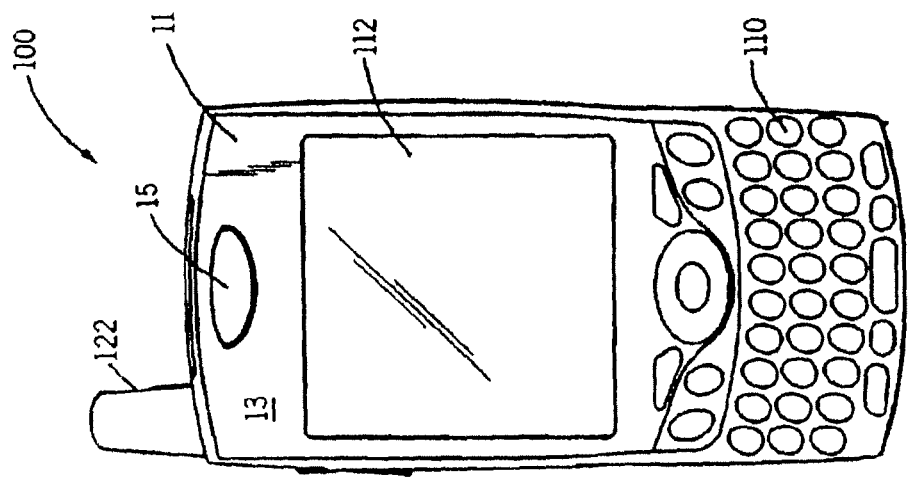
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality and is configured to be carried by a user while in use. The teachings herein can be applied to other mobile computing devices (e.g., a laptop computer) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 2:
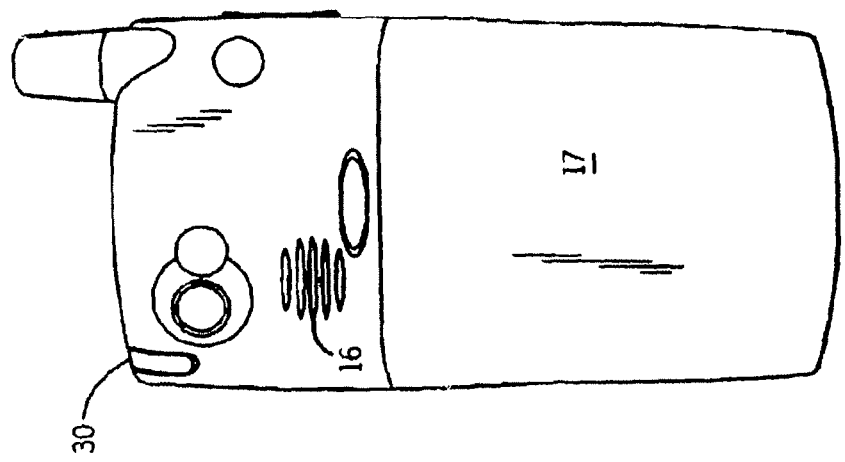
FIG. 2 is a back view of a mobile computing device, according to an exemplary embodiment.

Device 100 comprises a housing 11 having a front side 13 and a back side 17 (FIG. 2). An earpiece speaker 15, a loudspeaker 16 (FIG. 2), and a user input device 110 (e.g., a plurality of keys 110) are coupled to housing 11. Housing 11 is configured to hold a screen in a fixed relationship above a user input device 110 in a substantially parallel or same plane. This fixed relationship excludes a hinged or movable relationship between the screen and plurality of keys in the fixed embodiment. Device 100 may be a handheld computer, which is a computer small enough to be carried in a typical front pocket found in a pair of pants, comprising such devices as typical mobile telephones and personal digital assistants, but excluding typical laptop computers and tablet PCs. In alternative embodiments, display 112, user input device 110, earpiece 15 and loudspeaker 16 may each be positioned anywhere on front side 13, back side 17, or the edges therebetween.

In various embodiments device 100 has a width (shorter dimension) of no more than about 200 mm or no more than about 100 mm. According to some of these embodiments, housing 11 has a width of no more than about 85 mm or no more than about 65 mm. According to some embodiments, housing 11 has a width of at least about 30 mm or at least about 50 mm. According to some of these embodiments, housing 11 has a width of at least about 55 mm.

In some embodiments, housing 11 has a length (longer dimension) of no more than about 200 mm or no more than about 150 mm. According to some of these embodiments, housing 11 has a length of no more than about 135 mm or no more than about 125 mm. According to some embodiments, housing 11 has a length of at least about 70 mm or at least about 100 mm. According to some of these embodiments, housing 11 has a length of at least about 110 mm.

In some embodiments, housing 11 has a thickness (smallest dimension) of no more than about 150 mm or no more than about 50 mm. According to some of these embodiments, housing 11 has a thickness of no more than about 30 mm or no more than about 25 mm. According to some embodiments, housing 11 has a thickness of at least about 10 mm or at least about 15 mm. According to some of these embodiments, housing 11 has a thickness of at least about 50 mm.

In some embodiments, housing 11 has a volume of up to about 2500 cubic centimeters and/or up to about 1500 cubic centimeters. In some of these embodiments, housing 11 has a volume of up to about 1000 cubic centimeters and/or up to about 600 cubic centimeters.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, etc.

Device 100 may be configured to provide voice and/or data communications functionality through wireless access points (WAPs) in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth® system operating in accordance with the Bluetooth Special Interest Group (SIG) series of protocols.

Figure 3:
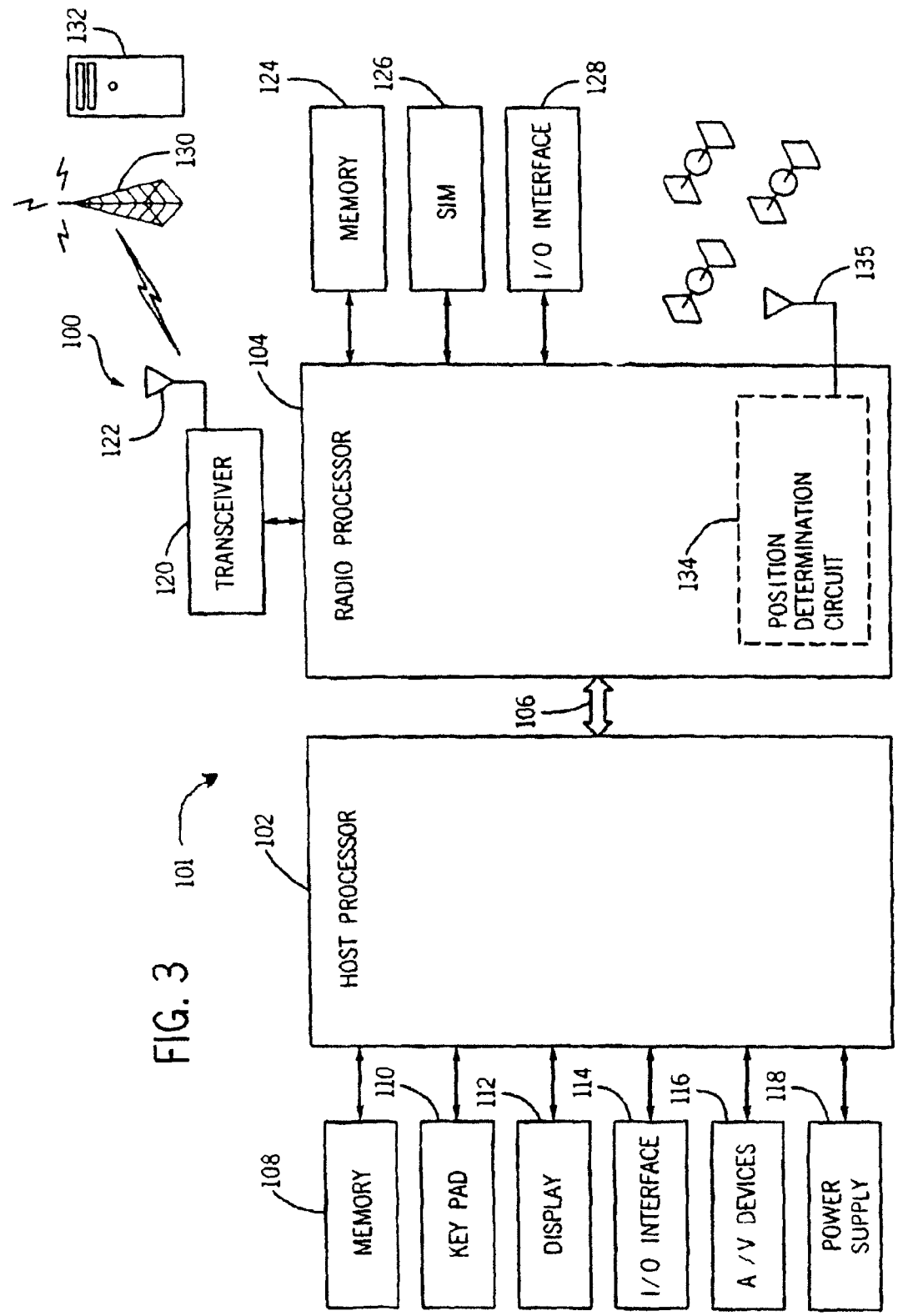
FIG. 3 is a block diagram of the mobile computing device of FIGS. 1 and 2, according to an exemplary embodiment.

As shown in the embodiment of FIG. 3, device 100 may comprise a processing circuit 101 which may comprise a dual processor architecture, including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise one processor, more than two processors, may be implemented as a dual- or multi-core chip with both host processor 102 and radio processor 104 on a single chip, etc. Alternatively, processing circuit 101 may comprise any digital and/or analog circuit elements, comprising discrete and/or solid state components, suitable for use with the embodiments disclosed herein.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, e-mail application, instant message (IM) application, short message service (SMS) application, multimedia message service (MMS) application, web browser application, personal information manager (PIM) application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an expansion slot to support a multimedia and/or memory card, for example.

Device 100 may comprise a user input device 110 coupled to the host processor 102. The user input device 110 may comprise, for example, an alphanumeric, numeric or QWERTY key layout and an integrated number dial pad.

Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 100. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

Device 100 may comprise a transceiver 120 coupled to the radio processor 104. The transceiver 120 may comprise one or more transceivers configured to communicate using different types of protocols, communication ranges, operating power requirements, RF sub-bands, information types (e.g., voice or data), use scenarios, applications, and so forth. For example, transceiver 120 may comprise a Wi-Fi transceiver and a cellular or WAN transceiver configured to operate simultaneously.

The transceiver 120 may be implemented using one or more chips as desired for a given implementation. Although the transceiver 120 may be shown as being separate from and external to the radio processor 104 for purposes of illustration, in various embodiments some portion or the entire transceiver 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver 120. The antenna system 122 may comprise or be implemented as one or more internal antennas and/or external antennas.

Device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to operate in one or more position determination modes including, for example, a standalone mode, a mobile station (MS) assisted mode, and/or a MS-based mode. In a standalone mode, such as a standalone GPS mode, device 100 may be configured to determine its position without receiving wireless navigation data from the network, though it may receive certain types of position assist data, such as almanac, ephemeris, and coarse data. In a standalone mode, device 100 may comprise a local position determination circuit 134 (e.g., a GPS receiver) which may be integrated within housing 11 (FIG. 1) configured to receive satellite data via an antenna 135 and to calculate a position fix. Local position determination circuit may alternatively comprise a GPS receiver in a second housing separate from housing 11 but in the vicinity of device 100 and configured to communicate with device 100 wirelessly (e.g., via a PAN, such as Bluetooth). When operating in an MS-assisted mode or an MS-based mode, however, device 100 may be configured to communicate over a radio access network 130 (e.g., UMTS radio access network) with a remote computer 132 (e.g., a position determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 100 may be configured to determine its position using acquisition data or other wireless data from the remote computer 132. The acquisition data may be provided periodically. In various implementations, device 100 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computing device 100, the remote computer 132 may handle various processing operations and also may provide information to aid position determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

In various implementations, the position assist data provided by the remote computer 132 may improve the speed of satellite acquisition and the probability of a position fix by concentrating the search for a GPS signal and/or may improve the accuracy of position determination. Each position fix or series of position fixes may be available at device 100 and/or at the remote computer 132 depending on the position determination mode. In some cases, data calls may be made and position assist data may be sent to device 100 from the remote computer 132 for every position fix (e.g., in an ad hoc mode). In other cases, data calls may be made and position assist data may be sent periodically and/or as needed.

In various embodiments, device 100 may comprise dedicated hardware circuits or structures, or a combination of dedicated hardware and associated software, to support position determination. For example, the transceiver 120 and the antenna system 122 may comprise GPS receiver or transceiver hardware and one or more associated antennas coupled to the radio processor 104 to support position determination.

The host processor 102 may comprise and/or implement at least one LBS (location-based service) application. In general, the LBS application may comprise any type of client application executed by the host processor 102, such as a GPS application, configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 100 or from a source external to device 100. For example, the user of device 100 may interact with a data input device to command the LBS application to send a location request. The LBS application also may send a location request in response to receiving input from an external network element or computing device that is attempting to locate the user of device 100. In some cases, the LBS application also may be configured to automatically, periodically, and/or autonomously send location requests.

Although other applications may operate without regard to the location of device 100, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

Radio processor 104 may be configured to invoke a position fix by configuring a position engine and requesting a position fix. For example, a position engine interface on radio processor 104 may set configuration parameters that control the position determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

The radio processor 104 may comprise or implement a position engine such as a GPS engine. In various embodiments, the position engine may be configured to provide position determination capabilities for device 100. In some embodiments, the position engine may be implemented as software operating in conjunction with hardware (e.g., GPS receiver hardware) allowing device 100 to receive and process GPS satellites signals for position determination. In one embodiment, the position engine may be implemented as a QUALCOMM® gpsOne® engine.

In various implementations, the position engine may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine also may be configured to operate in one or more position determination modes including a standalone mode, an MS-assisted mode, and an MS-based mode. The determined position information generated and/or obtained by the position engine generally may comprise any type of information associated with the position of device 100. Examples of position data may include, without limitation, current location, latitude, longitude, altitude, heading information, vector information such as horizontal and vertical velocity, sector-based position location, position fix information, position uncertainty, device orientation, cellular tower or cellular base station identifier, and so forth.

Figure 4:
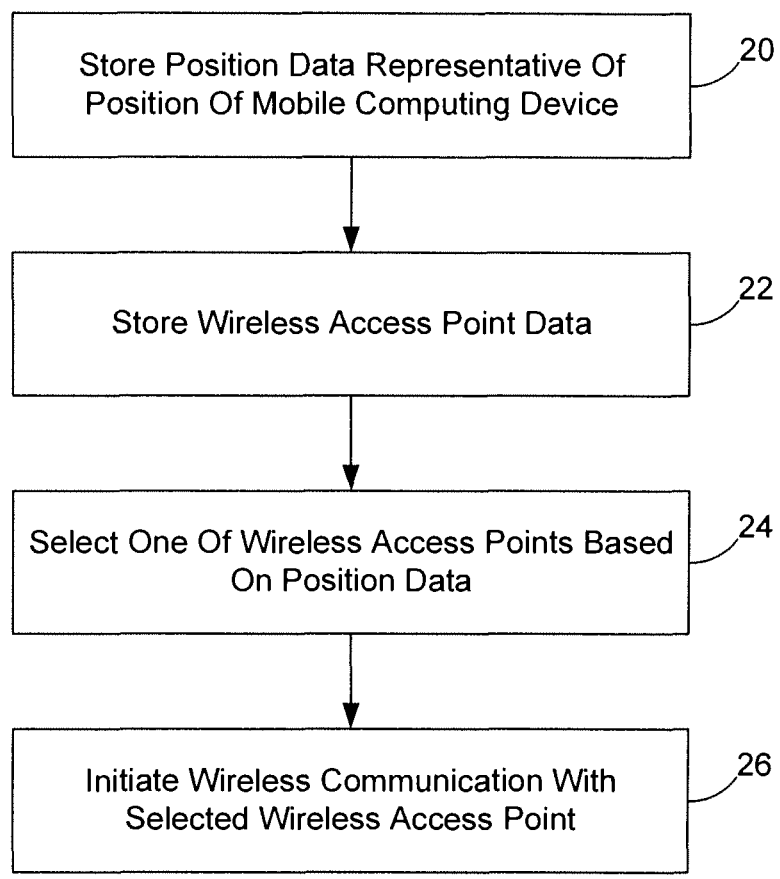
FIG. 4 is a flowchart illustrating a system and method of using position data to select a wireless access point, according to an exemplary embodiment.

Referring now to FIG. 4, an exemplary system and method of using position data to select a wireless access point will be described. At step 20, memory 108, 124 is configured to store position data representative of a position of the mobile computing device. The position data may be a position fix from position determination circuit 134, which may be generated in response to a user input or may have been previously-calculated but deemed by processing circuit 101 to be sufficiently recent or current to represent an approximate position of the mobile computing device. The position data may be provided from a calendar application operated by processing circuit 101, such as from a location field in a calendar appointment, wherein a user has entered a location in the location field and processing circuit 101 is configured to store or convert that location in a format suitable for use herein. The position data may be a cell site or cellular base station identifier generated by processing circuit 101 and/or received by processing circuit based on wireless communication via transceiver 120 with a cellular base station. Thus, the position data may be approximate, estimated, currently- or previously-calculated, user-entered, or even assumed. Further, the position data may be generated based on a plurality of these sources.

At step 22, memory 108, 124 is also configured to store wireless access point data for a plurality of wireless access points. The wireless access point data may be prestored based on prior scanning operations performed minutes, days, or hours previous to this particular user interaction with device 100, and/or may be collected and stored based on a current scanning operation. The wireless access point data may comprise one or more of a service set identifier (SSID), a network identifier, a media access control (MAC) address, an internet protocol (IP) address, etc. The wireless access point data further may comprise position data associated with the wireless access point, which may be different for each wireless access point, and which may be generated in any of a number of ways, such as described with reference to FIG. 5 below. The wireless access point data may optionally additionally comprise a configuration file or profile containing data useful to processing circuit 101 to scan for, initiate, establish, and/or maintain communication with a wireless access point. The wireless access point data may be stored as a database or other structured collection of data or records, wherein the records may further include data indicative of whether each wireless access point is in one or more user-preferred lists (e.g., a list which may be edited and maintained manually by the user or automatically updated based on whether a user has established communication with the a wireless access point), a prioritization scheme for the wireless access points based on recently-used or frequency-of-use criteria, signal strength, cost information for use of the network, network account or membership information, whether the wireless access points meets security and/or reliability criteria, hours of operation, etc. Processing circuit 101 may be configured to use any one or more of these records in the database to assist the user in manually or automatically selecting a wireless access point to scan for or with which to initiate, establish and/or maintain communication.

At step 24, processing circuit 101 is configured to select one of the plurality of wireless access points based on the position data and, at step 26, to initiate wireless communication with the selected wireless access point. The selection may be done in response to a user selection or without user selection based on pre-programmed criteria. Processing circuit 101 may use the position data of mobile computing device 100 to identify one or more wireless access points in the vicinity of mobile computing device 100 and then select the one or more wireless access points from among the database of wireless access points for further processing. Whether a wireless access point is in the vicinity of mobile computing device 100 may depend on the type of device position data and the type of wireless access point position data being used in the comparison. Vicinity criteria may be one or more of an estimated size of a cell site, a predetermined distance, within a city or other geographically-defined vicinity (e.g., zip code), etc. Processing circuit 101 may use the position data to narrow the available networks or wireless access points that device 100 will consider for communication, by determining that the wireless access points meet the vicinity characteristic or criteria. Processing circuit 101 may be configured to apply further criteria or characteristics beyond the position data to select a wireless access point or network for communication, such as, which network is on a preferred or trusted list, which network has a faster communication speed, which has a stronger signal, etc. According to one embodiment, at least one additional characteristic is applied to the narrowing or selection of wireless access points only if a plurality of identified wireless access points are within a vicinity of the mobile computing device (e.g., the wireless access points share a common cell ID characteristic, are within the same or approximately the same distance from device 100, etc.) This step of applying further criteria beyond the vicinity criteria may be particularly useful where the position data identifies a plurality of networks meeting the "vicinity" or nearness criteria.

According to one embodiment, processing circuit 101 is configured to initiate the wireless communication with the selected wireless access point prior to scanning or polling for available wireless access points at a position. In this embodiment, time and power may be saved by avoiding the process of scanning for a wireless access point previously-stored in the database which is known to processing circuit 101 to be distant from the position of mobile computing device. For example, processing circuit 101 may be configured to filter or select from some or all wireless access point data in the database based on position and/or known wireless access points (e.g., which may be known because device 100 has previously connected to them, previously found them in a scanning operation, or learned of them from manual entry by a user via a user input device or memory card, etc.) and to provide an output list which is a subset of the database, comprising one or more wireless access points. Processing circuit 101 may display the output list to the user for selection of one of the wireless access points to cause processing circuit 101 to initiate communication with the selected wireless access point. If the output list comprises only one wireless access point, processing circuit 101 may automatically or without user input initiate or attempt to initiate communication with the wireless access point in the list. If the output list comprises no wireless access points, processing circuit 101 may display all wireless access points in the database in any order (e.g., a random order, previously-defined user-preferred order, or an order based on other records in the database) and/or may initiate a scanning operation to find additional wireless access points within communication range of device 100.

According to another embodiment, in response to a user enabling the radio frequency transceiver (e.g., by powering-on the device, powering-on the radio transceiver, selecting an operation in an application requiring wireless communication, etc.), processing circuit 101 is configured to retrieve the device position data from memory, select one of the plurality of wireless access points based on the position data, and initiate the wireless communication with the selected wireless access point, all without requiring further user input (e.g., automatically). If a plurality of wireless access points meet the position criteria, processing circuit 101 may be configured to initiate communication with the first wireless access point it finds meeting the position criteria or it may use other database records to select one wireless access point for communication. In either case of automatic or manual initiation of communication, if the selected wireless access point is unavailable or communication is not otherwise established, processing circuit 101 may be configured to scan for available wireless access points (e.g., which scanning may only occur if the selected wireless access point is unavailable or may occur prior to selection of the wireless access point) and display identifiers for the found wireless access points to the user for selection. In an alternative embodiment, if processing circuit 101 finds a plurality of wireless access points meeting the position criteria, processing circuit 101 may be configured to display the wireless access points and one or more of the records from the database on display 112 and seek user selection or confirmation of a particular wireless access point for communication. The user may also be allowed to pre-program a preferred one of a subset of wireless access points meeting the position criteria for automatic connection.

According to one exemplary embodiment, processing circuit 101 is configured to display a plurality of wireless access point identifiers for nearby wireless access points only if the processing circuit fails to identify a preferred wireless access point identifier in the database based on the retrieved position data.

In step 26, initiation of the wireless communication may comprise scanning to find a wireless signal associated with the wireless access point, attempting to initiate or scan, establishing or attempting to establish wireless communication, etc. The initiation may be done in response to user input (e.g., selection or confirmation) or without requiring user input. If the network associated with the wireless access point is open and available, communication can be established. If the network is closed, locked, proprietary or secure, device 100 may be configured to provide a password or other credentials either from memory or from a user.

Figure 5:
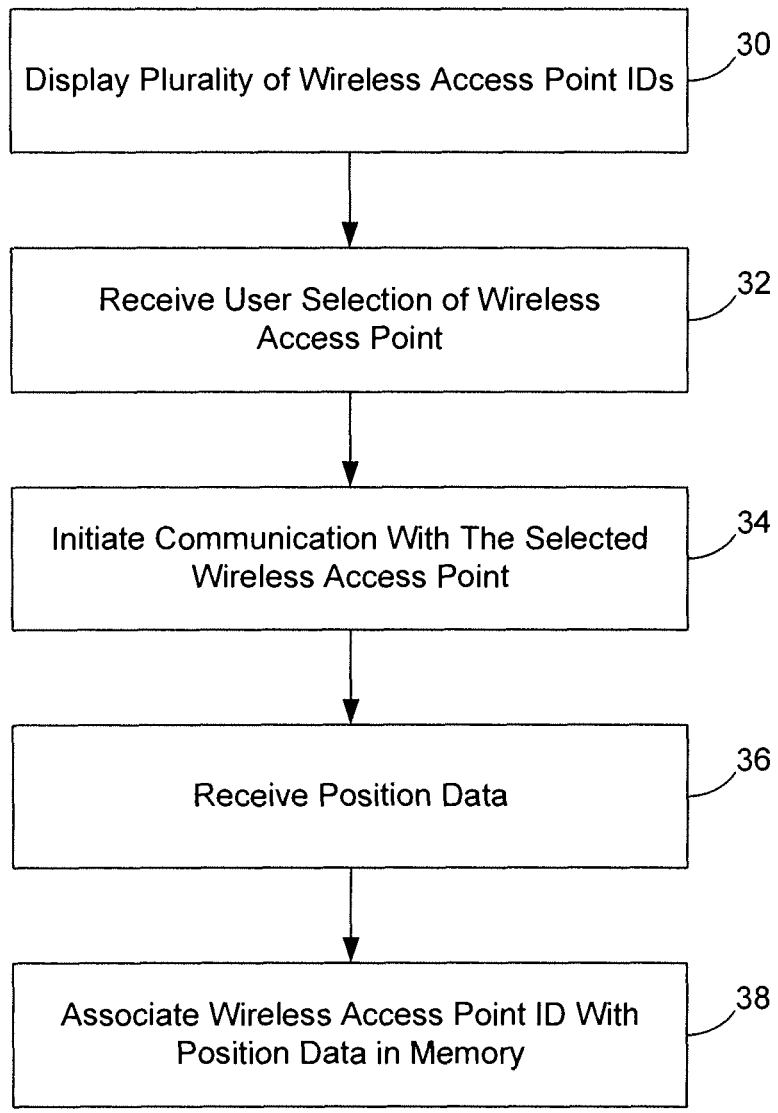
FIG. 5 is a flowchart illustrating a system and method of associating position data with a wireless access point identifier, according to an exemplary embodiment.

Referring now to FIG. 5, a system and method of associating position data with a wireless access point identifier will be described, according to an exemplary embodiment. Steps 30-38 may be used for any purpose, one example of which is to acquire position data associated with a wireless access point. At step 30, device 100 is configured to display a plurality of wireless access point identifiers on display 112. The wireless access point identifiers may be received as a result of a scanning operation in which processing circuit 101 scans or polls for wireless access points within communication range of transceiver 120. Alternatively, the wireless access point identifiers may be manually input or edited by a user, pre-programmed by a manufacturer, service professional, or enterprise information technology professional, downloaded from a network wirelessly or via a wired connection from a remote server, downloaded via a memory card, etc. and may be downloaded pursuant to a subscription service such as Boingo Wireless, Inc., Santa Monica, Calif.

At step 32, processing circuit 101 is configured to receive a user selection of one of the wireless access points identifiers via user input device 110. At step 34, processing circuit 101 is configured to initiate communication with the wireless access point in response to receiving the user selection which, as describe above, may include an attempt to initiate. At step 36, processing circuit 101 is configured to retrieve or receive position data representative of a position of device 100 or the wireless access point, which may be retrieved from memory or generated in this step. The position data may be based on a cell tower ID, which is representative of both the position of device 100 and the wireless access point. Further, processing circuit 101 may receive latitude/longitude data of device 100. The other methods of determining position described in this specification may be implemented.

At step 38, processing circuit 101 is configured to associate the wireless access point identifier with the position data in the memory. The data may be stored as a data pair or record comprising the wireless access point identifier and the position data. One or more position data points may be associated with a wireless access point identifier.

The method of FIG. 5 may occur at different times over the lifetime of device 100. As device 100 establishes communication with each wireless access point, processing circuit 101 stores the wireless access point identifier and associated position data in a list or database record indicating recently-used or frequency-of-use criteria, signal strength, cost information for use of the network, network account or membership information, whether the wireless access points meets security and/or reliability criteria, etc. The feature of storing position data associated with each wireless access point with which device 100 initiates or establishes communication may be enabled or disabled by the user.

According to one embodiment, processing circuit 101 is configured to create a database of preferred wireless access point identifiers based on a user manually selecting each wireless access point and initiating communication with each wireless access point and retrieving the associated position data based on the current position of the mobile computing device.

Figure 6:
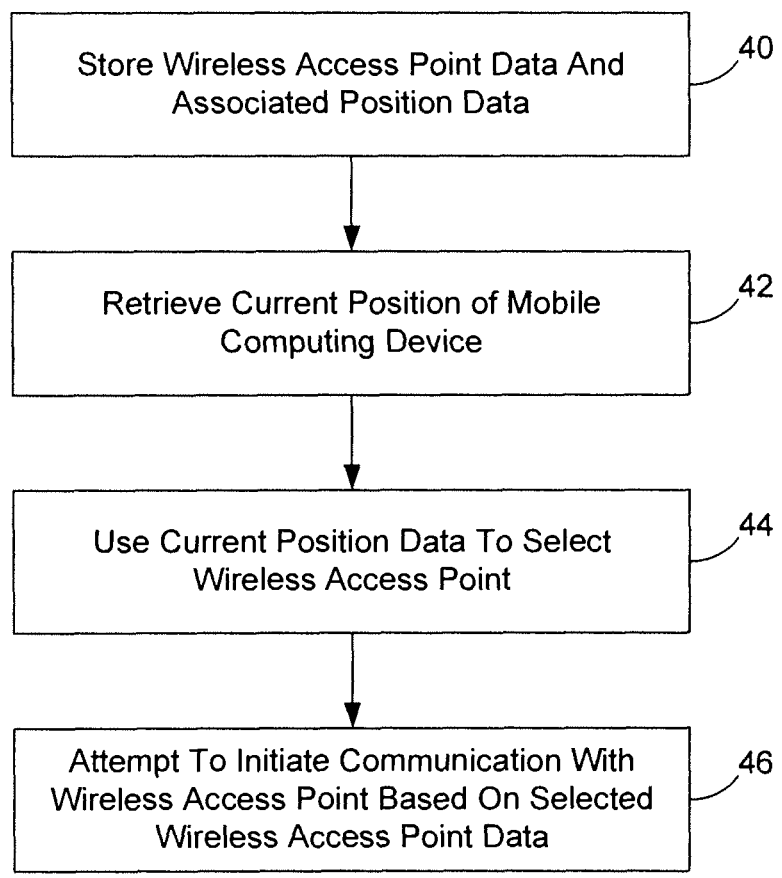
FIG. 6 is a flowchart illustrating a system and method of using position data to select a wireless access point, according to an exemplary embodiment.

Referring now to FIG. 6, a system and method of using position data to select a wireless access point will be described, according to an exemplary embodiment. At step 40, processing circuit 101 is configured to store wireless access point data and associated position data for a plurality of wireless access points. At step 42, processing circuit 101 is configured to retrieve a current position of the mobile computing device, which may be done using any of the techniques described in this specification. At step 44, processing circuit 101 is configured to use the current position data to select wireless access point data from memory. At step 46, processing circuit 101 is configured to attempt to initiate communication with a wireless access point based on the selected wireless access point data. The attempt to initiate communication may comprise a scanning, polling, or search operation, and may be limited to wireless access points in a preferred list. The step of initiating may be done without requiring input from the user.

Figure 7:
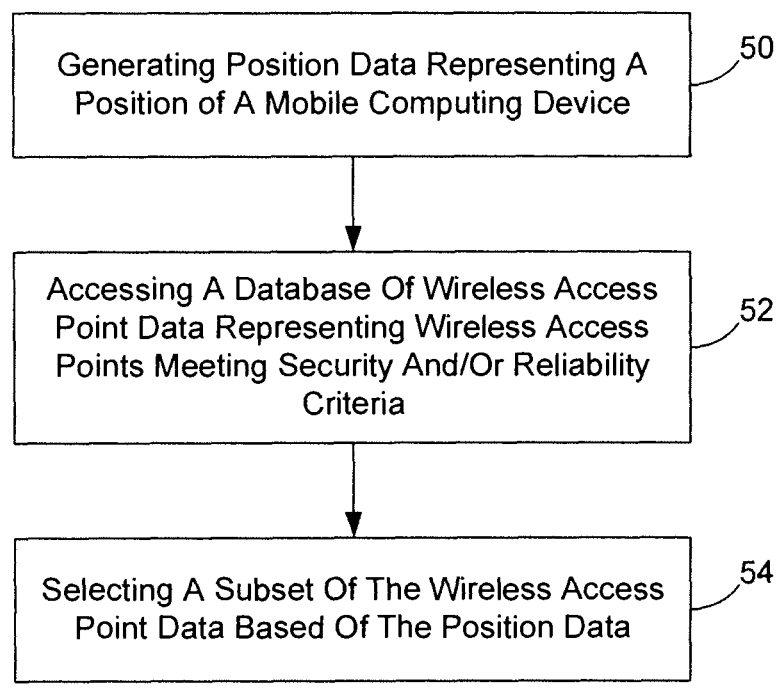
FIG. 7 is a flowchart illustrating a system and method of using position data to select a wireless access point, according to an exemplary embodiment.

Referring now to FIG. 7, a system and method of using position data to select a wireless access point will be described. At step 50, device 100 is configured to generate position data representing a position of a mobile computing device. At step 52, processing circuit 101 is configured to access a database of wireless access point data representing wireless access points meeting at least one of a security criterion or reliability criterion. The database may be local in memory 108, 124 or may be stored on a remote server and accessed wirelessly via a WAN, such as a cellular network. The database may further be a subscription service. Processing circuit 101 may be configured to determine whether a wireless access point meets the security or reliability criterion by determining whether the wireless access point is a member of the remote database of approved wireless access points. The security criterion or reliability criterion can be predetermined by the service provider or by the user and may be used by device 100 as a filter. For example, the service provider may screen out networks having insufficient security measures to prevent keylogging data or other security attacks. The security criteria may comprise social criteria. For example, a wireless access point must have an access point server in a locked environment to avoid tampering by employees. The security criteria may comprise technical criteria. For example, a provider of the access point may be required to run software on their local wireless system that reports statistics and usage to the service provider aggregator to check for keylogging or traffic re-routing. The software would either create a unique identifier allowing client devices to see the provider or add it to a trusted list.

At step 54, processing circuit 101 is configured to select a subset (e.g., one or more) of the wireless access point data in the database based on the position data.

According to one embodiment, processing circuit 101 is configured to create the database of preferred wireless access points based at least in part on the wireless access points meeting a security or reliability criterion Exemplary Scenarios In one use scenario of an exemplary embodiment, a user of device 100 launches an application requiring or requesting wireless communication with a wireless access point, in particular a Wi-Fi network access point. Rather than scan for, identify, and/or attempt to establish communications with all available Wi-Fi networks or even Wi-Fi networks in a user's preferred or recently-access list, which consumes time and battery life, processing circuit 101 first requests a position fix from position determination circuit 134. Position determination circuit 134 generates a position fix and forwards the position fix to processing circuit 101. Processing circuit 101 searches a database of Wi-Fi access points in memory 108 for access points known to be within a predetermined distance of the currently-generated position fix. One Wi-Fi access point is identified from the database. Processing circuit 101 then receives the Wi-Fi access point SSID and other configuration or profile data and attempts to initiate communication with the Wi-Fi access point. If the communication attempt does not succeed, processing circuit 101 then obtains a cell tower ID from a nearby cell site and uses the cell tower ID to search for additional Wi-Fi access points in the database. Once one is found, communication is initiated and established.

In the scenario, the process may require no user input, or may allow user input at various stages. The process may be transparent to the user, or may provide visual or audible prompts throughout the process to apprise the user the steps being taken by device 100.

In another use scenario, a user carriers device 100 into a Starbucks store in City A offering a T-Mobile Wi-Fi network service. A user has learned from past experience that the speed of the T-Mobile Wi-Fi network at this location is good, but the speed of a second T-Mobile Wi-Fi network at a Starbuck's store in City B is slower, so the user prefers to use a Google Wi-Fi network at the Starbuck's store in City B. When in City A, device 100 compares its position data to its database of wireless access points and selects the T-Mobile Wi-Fi network service as the preferred WAP at this location. When in City B, device 100 compares its position data to its database of wireless access points and selects the Google Wi-Fi network. In this scenario, the T-Mobile Wi-Fi network services both use the same SSID, but the position different allows device 100 to distinguish one from the other.

In another use scenario with reference to the embodiment of FIG. 7, a user arrives in an airport in Oklahoma City, having never been to Oklahoma. Thus, the user's device 100 does not have any database of previously-connected Wi-Fi access points for that position. When device 100 is activated, device 100 scans for and identifies twenty different access points. The user does not know which of the identified access points are for trusted networks and which are run by unscrupulous entities. The user invokes an application on device 100 which retrieves position data for device 100 and searches a database of approved access points to select an approved, trusted network within the vicinity of device 100. The database may be one operated by Boingo Wireless, Inc. is local to device 100 and updated periodically (e.g., daily, weekly, with each data synchronization, whenever a wireless communication is established, etc.) The application selects a trusted wireless access point for the location and wireless communication is established.

One or more of the processes described in this specification may be operable from a software module, such as a connection manager, such as a Wi-Fi smart connection manager. The Wi-Fi smart connection manager may be configured to use position data to select a subset of wireless access points and to then pass the subset of wireless access points to a connection manager configured to establish a wireless connection.

One or more of the process steps may be accomplished automatically, i.e., without requiring user input, in various embodiments.

One or more embodiments may use data indicating that device 100 has connected to a wireless access point in roughly or approximately the same location during a previous time to connect (optionally automatically connect) to a same wireless access point.

According to one embodiment, the database record for a wireless access point may comprise more than one position data, which may further be obtained from different sources (e.g., a location field from a calendar application and a position fix from a position determination circuit may both be stored). For example, if processing circuit 101 determines that more than one Wi-Fi network is within the vicinity or range of device 100, A-GPS, GPS, and/or calendar data may be checked to select a preferred network at that location.

With reference to the disclosure and claims, use of the phrase "based on" means "based in least in part on," and use of the term "a," "an" or "one" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the Figs., and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device, comprising:
 a radio frequency transceiver configured to communicate with wireless access points of a wireless wide-area network (WWAN) system;
 a memory configured to store position data representative of a position of the mobile computing device and wireless access point data for a plurality of wireless access points of the WWAN system, wherein the wireless access point data includes position data associated with a wireless access point of the WWAN system; and
 a processing circuit configured to select one of the plurality of wireless access points within a vicinity of the mobile computing device based on the position data representative of the position of the mobile computing device and the position data associated with the wireless access point of the WWAN system, and based on a trusted list of wireless access points that report statistics and usage to a service provider, the processing circuit being further configured to initiate wireless communication with the selected wireless access point.

2. The mobile computing device of claim 1, wherein the processing circuit is configured to initiate the wireless communication with the selected wireless access point and is further configured to scan for available wireless access points if the selected wireless access point is unavailable.

3. The mobile computing device of claim 1, wherein the processing circuit is configured to operate a calendar application to receive the position data.

4. The mobile computing device of claim 1, further comprising a position determination circuit configured to generate the position data.

5. The mobile computing device of claim 1, further comprising a cellular transceiver coupled to the processing circuit, wherein the processing circuit is configured to generate the position data based on wireless communication via the cellular transceiver with a cellular base station to receive a base station identifier.

6. The mobile computing device of claim 1, wherein the processing circuit is configured to display a plurality of wireless access point identifiers, to receive a user selection of one of the plurality of wireless access point identifiers, to retrieve current position data for the mobile computing device, and to store data in memory associating the user-selected wireless access point identifier with the current position data.

7. The mobile computing device of claim 6, wherein the processing circuit is configured to store a database comprising a plurality of preferred wireless access point identifiers, each with different associated position data.

8. The mobile computing device of claim 7, wherein in response to the user enabling the radio frequency transceiver, the processing circuit is configured to retrieve the position data from memory, select the one of the plurality of wireless access points based on the position data, and initiate the wireless communication with the selected wireless access point, all without requiring further user input.

9. The mobile computing device of claim 8, wherein the processing circuit is configured to display a plurality of wireless access point identifiers for nearby wireless access points only if the processing circuit fails to identify a preferred wireless access point identifier in the database based on the retrieved position data.

10. The mobile computing device of claim 7, wherein the processing circuit is configured to create the database of preferred wireless access point identifiers based on a user manually selecting each wireless access point and initiating communication with each wireless access point and retrieving the associated position data based on the current position of the mobile computing device.

11. The mobile computing device of claim 7, wherein the processing circuit is configured to create the database of preferred wireless access points based at least in part on the wireless access points meeting a security or reliability criterion.

12. The mobile computing device of claim 11, wherein the processing circuit is configured to determine whether a wireless access point meets the security or reliability criterion by determining whether the wireless access point is a member of a remote database of approved wireless access points.

13. A mobile computing device, comprising:
a radio frequency transceiver configured to communicate with wireless access points of a wireless wide-area network (WWAN) system;
a memory;
a user input device;
a display; and
a processing circuit configured to use a trusted list of wireless access points that report statistics and usage to a service provider for selection of a wireless access point identifier corresponding to the wireless access point, to display a plurality of wireless access point identifiers of wireless access points within a vicinity of the mobile computing device on the display, to receive a user selection of one of the wireless access point identifiers via the user input device, to initiate communication with a wireless access point of the WWAN system corresponding to the wireless access point identifier in response to receiving the user selection, to retrieve position data representative of a position of the mobile computing device, and to associate the wireless access point identifier of the wireless access point of the WWAN system with the position data in the memory.

14. The mobile computing device of claim 13, wherein the mobile computing device comprises a housing configured to be carried by a user while in use, a telephony communication circuit, and a plurality of personal information management applications configured to synchronize personal data with a remote computer.

15. A method operable on a mobile computing device for using position data to select a wireless access point within a vicinity of the mobile computing device, comprising:
storing wireless access point data and associated position data for a plurality of wireless access points of a wireless wide-area network (WWAN) system, wherein the wireless access point data includes position data associated with a wireless access point of the WWAN system;
storing, associated with said access point data, a trusted list of wireless access points that report statistics and usage to a service provider;
retrieving a current position of the mobile computing device;
using the current position, the trusted list of wireless access points, and the position data associated with a wireless access point of the WWAN system to select wireless access point data from memory; and
attempting to initiate communication with a wireless access point based on the selected wireless access point data.

16. The method of claim 15, wherein attempting to initiate communication with the wireless access point based on the selected wireless access point data occurs without requiring input from a user.

17. The method of claim 15, wherein the position data comprises a cellular base station identifier.

18. A method of identifying a subset of wireless access points within a vicinity of a mobile computing device to assist a user in communicating with a wireless access point of a wireless wide-area network (WWAN) system, comprising:
generating position data representing a position of the mobile computing device;
accessing a database of wireless access point data representing a trusted list of wireless access points that report statistics and usage to a service provider, wherein the wireless access point data includes position data associated with a wireless access point of the WWAN system, and accessing the database comprises accessing the database via a server remote from the mobile computing device; and selecting a subset of the wireless access point data in the database based on the position data.

19. The method of claim 18, further comprising:
displaying the subset of the wireless access points to a user;
receiving a user selection of a wireless access point; and
initiating communication with the user-selected wireless access point.

20. The method of claim 19 wherein the subset of wireless access points is further selected based on an access point priority, the priority being based on at least one of cost information for use of the network, network account information, membership information or hours of operation.

21. A method of selecting a wireless access point of a wireless wide-area network (WWAN) system for communication, comprising:
receiving position data representing a position of a mobile computing device;
identifying wireless access points of the WWAN system within a vicinity of the mobile computing device;
selecting a wireless access point of the WWAN system based on a trusted list of wireless access points that report statistics and usage to a service provider, the position data representing the position of the mobile computing device, and position data associated with a wireless access point of the identified wireless access points; and
initiating communication with the selected wireless access point.

22. The mobile computing device of claim 1, wherein the wireless access points run instructions on their local wireless system that report the statistics and usage to a service provider aggregator to check for at least one of keylogging or traffic re-routing.

23. The mobile computing device of claim 22, wherein the instructions add the access points to the trusted list, and the access points of the trusted list each have an access point server in a locked environment to avoid tampering by employees.

24. The mobile computing device of claim 13, wherein the wireless access points run instructions on their local wireless system that report the statistics and usage to a service provider aggregator to check for at least one of keylogging or traffic re-routing for selection of the wireless access point identifier corresponding to the wireless access point.

25. The mobile computing device of claim 24, wherein the instructions add the access points to the trusted list, and the access points of the trusted list each have an access point server in a locked environment to avoid tampering by employees.

26. The method of claim 15,
wherein the wireless access points run instructions on their local wireless system that report the statistics and usage to a service provider aggregator to check for at least one of keylogging or traffic re-routing.

27. The method of claim 26, wherein the instructions add the access points to the trusted list, and the access points of the trusted list each have an access point server in a locked environment to avoid tampering by employees.

28. The method of claim 18, wherein the wireless access points run instructions on their local wireless system that report the statistics and usage to a service provider aggregator to check for at least one of keylogging or traffic re-routing.

29. The method of claim 28, wherein the instructions add the access points to the trusted list, and the access points of the trusted list each have an access point server in a locked environment to avoid tampering by employees.

30. The method of claim 21, wherein the wireless access points run instructions on their local wireless system that report the statistics and usage to a service provider aggregator to check for at least one of keylogging or traffic re-routing.

31. The method of claim 30, wherein the instructions add the access points to the trusted list, and the access points of the trusted list each have an access point server in a locked environment to avoid tampering by employees.

* * * * *